United States Patent Office 3,504,905
Patented Apr. 7, 1970

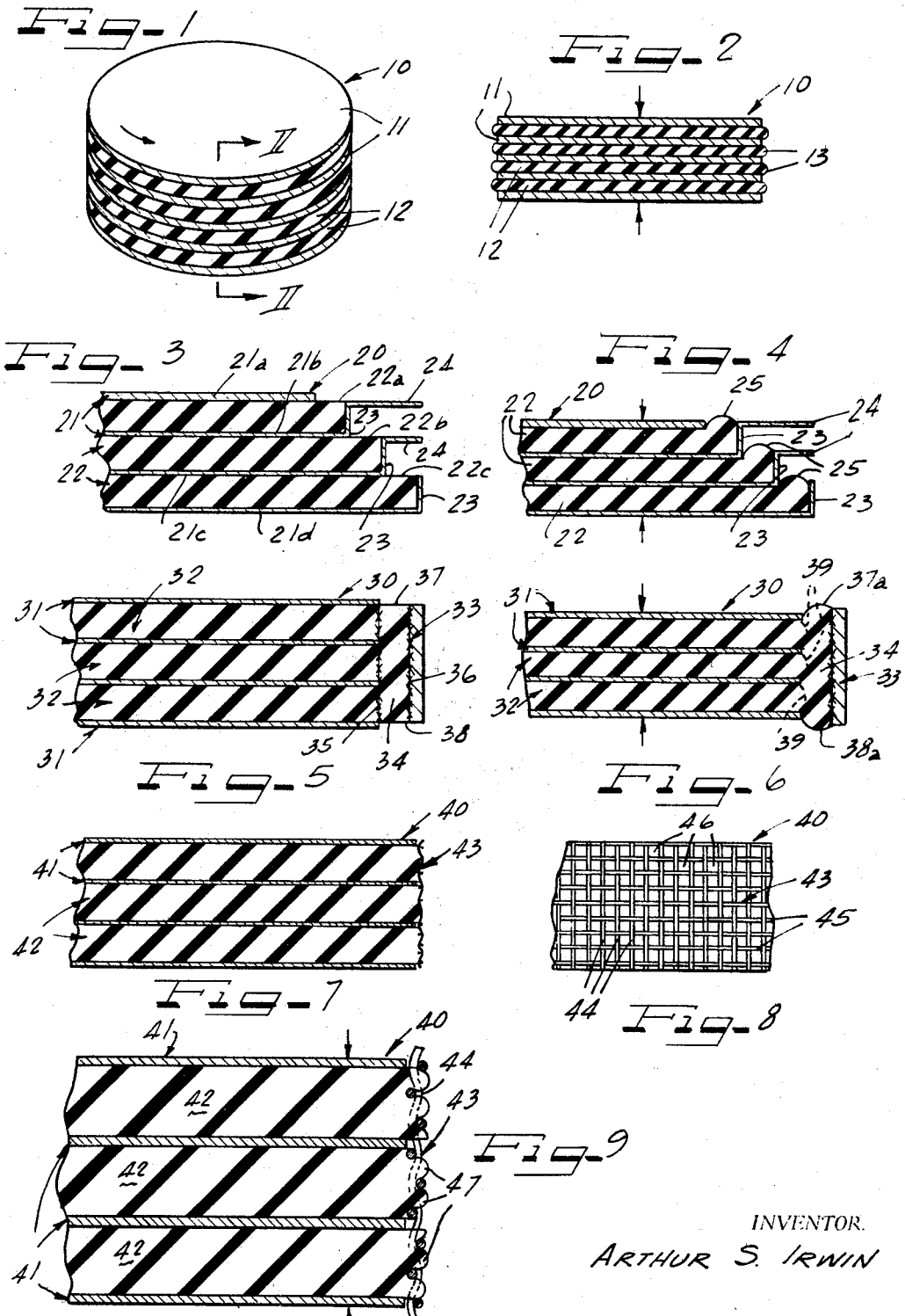

3,504,905
HIGH LOAD CAPACITY LAMINATED BEARING
Arthur S. Irwin, Jamestown, N.Y., assignor to TRW Inc., Cleveland, Ohio, a corporation of Ohio
Filed Sept. 7, 1967, Ser. No. 666,102
Int. Cl. F16f 1/50, 1/54
U.S. Cl. 267—1                                         11 Claims

ABSTRACT OF THE DISCLOSURE

Laminated bearings composed of a stack of bonded together alternate layers of non-elastomeric bearing material, such as metal, and elastomeric material, such as rubber, capable of supporting axial loads while yielding to shear forces so that the non-elastomer layers may shift relative to each other where the tendency of the elastomer layers to flow laterally or extrude when the stack is axially loaded is deterred or controlled by baffling. This baffling can be provided by shoulders or flanges on the non-elastomer layers which change the direction of flow of the extruding elastomer to add resistance to flow, by a rigid open-ended sleeve or collar surrounding the stack and bonded thereto through an elastomer layer sufficiently thick and pliable to flow axially to the open ends of the sleeve as the elastomer layers flow laterally thereby impeding the lateral flow, by a ring of axially extending circumferentially spaced rods, such as the warp windings of a wire screen cloth sleeve, surrounding the stack, or by any means which accommodate but yet impede extrusion of the elastomer layers to preserve the capacity of these layers to yield under shear forces even when the stack is heavily loaded.

BACKGROUND OF THE INVENTION

Field of the invention

This invention relates to the art of laminated static load bearings or thrust bearings capable of supporting loads while yielding to torsion forces so as to accommodate relative displacement of the opposite ends of the bearing. The bearing laminae are composed of alternate layers of bonded together thin shims of non-elastic material such as metal, plastic or the like, and elastomeric material having interparticle flow properties yielding to shear stresses for accommodating relative rotation of adjacent metal shims.

Prior art

Laminated bearings composed of a stack of thin laminae of bonded together alternate layers of metal shims and elastomer are known in the art, as for example in the Hinks U.S. Patent Nos. 2,900,182 and 3,071,422. Such prior art laminated bearings have the elastomer laminae sufficiently thin and resistant to extrusion so as to be relatively incompressible thereby maintaining the height of the stack even under heavy axial loads on the stack. However, since the force required to shear an elastomer layer is approximately proportional to the thickness of the elastomer it follows that the capacity of a laminated bearing to yield to torsional twisting while resisting loads tending to decrease the height of the bearing is limited by inevitable lateral flow or extrusion of the elastomer laminae even when very thin laminae are used. The prior art also recognized that there was a tendency for laminated bearings to buckle under heavy load, especially when a large number of laminae were required to accommodate to meet the torsion deflection specifications for certain installations, and various embracing sleeves, struts, or the like were proposed to prevent buckling. However, the prior art did not provide for the control of the extrusion of the elastomer laminae under heavy axial loads beyond the confines of the adjacent metal laminae without completely stopping the flow as by the buckling preventing sleeves.

SUMMARY

The present invention now recognizes that the elastomer layers in laminated bearings may extrude or flow laterally beyond the metal laminae under heavy axial loads on the bearing and controls this extrusion or flow by means of baffling which will not interfere with the capacity of the bearing to absorb torsional loads. To this end, the invention uses suitable baffling to impede but not to completely prevent extrusion of the elastomer laminae. This baffling makes possible the use of thicker elastomer laminae to accommodate greater shear forces without permitting the bearing to collapse under axial load. The baffling also serves to maintain the height of the bearing stack within permissible deflection ranges.

The baffling provided by this invention may take many different forms which will accommodate and control extrusion of the elastomer laminae beyond the metal laminae when the bearing stack is loaded. One form of baffling includes shoulders or rims on the peripheries of the metal laminae. A second form of baffling includes a rigid open-ended sleeve such as a metal ring surrounding the bearing stack and bonded therethrough by a layer or column of elastomer which can be integral with the elastomer laminae but has sufficient flow capacity to bulge into the open ends of the ring for accommodating the extrusion flow of the elastomer laminae. Still another suitable form of baffling includes a band of circumferentially spaced upstanding rods around the bearing stack which can deflect to accommodate twisting of the stack but which baffle the lateral flow or extrusion of the elastomer laminae. These rods can conveniently be the warp windings of a wire screen cloth sleeve embracing the bearing stack.

It is, then, an object of this invention to provide a laminated static load or thrust load carrying bearing composed of alterntae layers of bonded together non-elastomeric and elastomeric laminae where lateral flow or extrusion of the elastomeric laminae is controlled by baffling.

Another object of this invention is to provide a laminated bearing composed of alternate layers of rubber and metal in bonded together relation with baffle means which impedes and controls the tendency of the elastomer layers to extrude beyond the metal layers.

A further object of the invention is to provide baffles in laminated bearings which will change the direction of flow of extruding elastomer material under a heavy load on the bearing.

A still further object of this invention is to provide a laminated bearing composed of a stack of bonded together alternate layers of bonded together metal and elastomer laminae where the elastomer laminae may be relatively thick to accommodate large shear forces but where flow of the elastomer in a direction which would accommodate decrease in height of the stack is controlled to maintain the stack height within a specified dimension.

BRIEF DESCRIPTION OF THE DRAWING

FIGURE 1 is a perspective view of a conventional laminated bearing composed of bonded together alternate layers of metal and rubber;

FIGURE 2 is a cross sectional view of the bearing of FIGURE 1 taken along the line II—II of FIGURE 1 but illustrating the bearing under heavy axial load and showing the extrusion of the rubber layers;

FIGURE 3 is a fragmentary enlarged cross sectional view of a laminated bearing similar to the bearing of FIG- URES 1 and 2 but provided with baffling according to this invention for impeding extrusion or lateral flow of the rubber layers under load;

FIGURE 4 is a view similar to FIGURE 3 but illustrating the bearing under heavy axial load;

FIGURE 5 is a view similar to FIGURE 3 but illustrating another form of baffling for impeding the axial flow or extrusion of the rubber layers;

FIGURE 6 is a view similar to FIGURE 5 but ilustrating the bearing of FIGURE 5 under heavy axial load;

FIGURE 7 is a view similar to FIGURE 3 but illustrating another form of baffling for impeding lateral flow or extrusion of the rubber layers;

FIGURE 8 is a fragmentary side elevational view of the bearing of FIGURE 7 further illustrating the form of the baffling; and FIGURE 9 is an enlarged fragmentary sectional view of the bearing of FIGURE 7 under heavy axial load.

DESCRIPTION OF THE PREFERRED EMBODIMENTS

The laminated bearing 10 of FIGURES 1 and 2 is composed of a vertical stack of metal disks 11 and rubber disks 12 in alternate series relation. The metal disks 11 as shown are preferably thinner than the rubber disks 12 but may be equal or greater in thickness than the rubber disks. The rubber and metal disks forming the stacks are bonded together to provide the laminae of the bearing. As shown, the peripheral edges of the rubber disks 12 are freely exposed. When the bearing 10 is axially loaded sufficiently to cause interparticle flow of the rubber layers 12, the exposed peripheries of these layers will bow or extrude beyond the metal disks 11 as shown at 13 in FIGURE 2. The unrestricted flow of the rubber beyond the peripheries of the metal layers 11 will allow the rubber layers to decrease in thickness thereby diminishing the height of the bearing stack. To maintain the height of the stack within reasonable limits under various load conditions without reducing the shear capacity of the rubber laminae as by the use of very thin rubber laminae, the present invention now impedes or controls the bulging or extrusion of the rubber beyond the peripheries of the metal disks.

According to one embodiment of this invention, a laminated bearing 20 shown in FIGURES 3 and 4 composed of alternate bonded together thin metal disks 21 and thicker rubber disks 22 has the successive metal disks in the stack of progressively increasing diameter and with each metal disk below the top disk having an upstanding peripheral wall or flange overlying the periphery of the rubber disk. Thus, as shown in FIGURE 3, the top metal disk 21a is smaller in diameter than the next adjacent metal disk 21b. Then the next disk 21c is larger in diameter than the disk 21b while the bottom disk 21d is larger in diameter than the disk 21c. This progressive increase in diameter of the disks produces a stepped tapered contour for the stack with the top disk having the smallest diameter and the bottom disk having the largest diameter. The disks 21b, 21c and 21d each have flanges around the peripheries thereof of the same height as the unloaded thickness of the rubber disks 22. In order to provide a constant diameter for the stack, the flanges on the peripheries of the intermediate disks 21b and 21c have outturned legs 24 extending to the same diameter as the largest disk 21d.

The rubber disks 22, like the disks 21, are of progressively increasing diameter and abut the flanges 23 of the metal disks. Thus, each rubber disk 22 will have an exposed top marginal face, such as the faces 22a, 22b and 22c, between the peripheries of the successive metal disks.

When the bearing 20 is placed under sufficient axial load to cause interparticle flow of the rubber disks 22, the normal lateral extrusion of the rubber to form bulges, such as 13 shown in FIGURE 2, is impeded or controlled by the flanges 23 and the lateral flow is turned 90° by the flanges to add resistance to the flow, but at the same time flow is accommodated through the open faces 22a, 22b and 22c of the rubber disks. These faces thus will be bulged as shown at 25 in FIGURE 4. The extent of the escape paths or flow of the rubber disks is controlled so that a desired thickness range for the disks will be maintained under all load conditions without destroying the shear capacity of the rubber disks.

The rubber disks 22 may be bonded only to the flat faces or main body portions of the metal disks and not to the upstanding flanges 23 in order that these flanges will serve as abutment walls for the laterally extruding rubber and merely turn the direction of extrusion into an axial flow. The peripheries of the rubber disks, on the other hand, may be bonded to the flanges 23 if such bonds do not adversely affect the axial flow of the rubber.

The bearing 20 of FIGURES 3 and 4 will accommodate the same torsional deflection as the bearing 10 with the same number of rubber disks but will better resist collapse of the bearing under heavy axial loads because the lateral flow or extrusion of the rubber layers is controlled by baffling.

Another construction for controlling lateral flow of the rubber laminae of the laminated bearings, according to this invention, is shown in FIGURES 5 and 6 wherein the bearing 30 is composed of bonded together thin metal laminae 31 and thicker rubber laminae 32. In the bearing 30 the laminae are in circular disk form as in the bearing 20 but have the same diameter. A rigid sleeve or collar ring 33 of larger diameter than the disks 31 and 32 surrounds the stack and is bonded thereto by an intermediate ring of rubber 34. Bond lines 35 and 36 illustrate that the rubber layer 34 is integrally bonded not only to the peripheries of the rubber disks 32 but also to the inner face of the ring 33. The rubber layer 34 has an exposed end face 37 between the top disks 31 and the top of the ring 33 and a bottom exposed face 38 between the bottom metal disk 31 and the ring 33. These exposed faces 37 and 38 provided escape paths for rubber flow when the bearing is axially loaded sufficiently to decrease the thickness of the rubber disks 32.

As shown in FIGURE 6, when the bearing 30 is axially loaded so as to cause buldging or lateral flow of the rubber disks 32 beyond the peripheries of the metal disks 31 as at 39 the rubber layer 34 resists or impedes the lateral flow and since the ring 33 prevents radial deformation of this rubber layer 34, the flow can only be accommodated through the exposed faces 37 and 38 which are thus bulged as at 37a and 38a, beyond the free state condition of the layer 34. Thus, the rigid ring 33 forms the function of the upstanding flanges 23 in the bearing 20 and the rubber layer 34 provides a flowable media impeding but not stopping the lateral flow of the rubber disks beyond the peripheries of the metal disks. The rubber layer 34 has a controlled flow capacity under load and is so dimensioned as to absorb the full torsional displacement of the bearing in use while of course, preventing the axial collapse of the bearing under heavy load.

Another construction for controlling or impeding the lateral flow or extrusion of the rubber layers in a laminated bearing, according to this invention, is shown in the bearing 40 of FIGURES 7 to 9 wherein thin metal disks 41 alternate with and are bonded to thicker rubber disks 42. The rubber disks 42 are preferably of slightly larger diameter than the disks 41 and, in their free state, as shown in FIGURE 7 project beyond the peripheries of the metal disks 41. A wire screen sleeve 43 surrounds the bearing 40 and tightly embraces the peripheries of the rubber disks 42 without engaging the peripheries of the metal disks 41. The wire screen sleeve is composed of axially upstanding warp windings 44 and peripherially extending woof windings 45. The windings provide an open lattice construction with foramina 46 therebetween. The warp windings 44 provide a series of upstanding rods held by the woof windings around the peripheries of the rubber disks 42 and serving to impede free lateral extrusion or flow of the rubber as the bearing stack 40 is axially loaded sufficiently to cause lateral flow of the rubber. The wire screen with the upstanding rod-like warp 44 and the circumferential woof 45 will readily accommodate twisting of the bearing stack under torsional load.

Thus, as shown in FIGURE 9, the upstanding woof rod or winding 44 provides a barrier against lateral flow of the rubber disks 40 and the rubber can only bulge through the open foramina 46 provided by the screened lattice. Rubber bulges 47 beyond the outer face of the screen sleeve 43 may be formed under extreme axial load conditions on the bearing. Thus, the screen for 43 provides the baffling means for impeding and controlling the lateral extrusion of the rubber disks.

It will be understood, of course, that in all embodiments of this invention the lateral flow capacity of the rubber laminae under heavy load on the bearing can be controlled by the type of rubber that is used and by the thickness of the rubber. It will also be understood that while metal is described as the preferred non-elastomeric material and rubber is described as the preferred elastomeric material, many different materials are operative. Thus plastic, glass, wood, or the like, are useful for the non-elastomeric material and any natural or synthetic material having elastic interparticle flow properties but being relatively non-compressible is useful for the elastomer. It will also be understood that while the preferred embodiments include the use of thin non-elastomer laminae in combination with thicker elastomer laminae, the thickness of the non-elastomeric material can be varied as desired. Any bonding technique may be used to form a unitary bonding together of the non-elastomer and elastomer layers, including adhesives, vulcanization, or the like.

I claim as my invention:

1. A laminated bearing comprising a stack of alternate bonded together layers of elastomer and non-elastomer materials accommodating torsional deflection under axial load, said elastomer layers being at least twice as thick as said non-elastomer layers and capable of lateral flow of elastomer beyond the normal unloaded perimeters thereof, baffle means surrounding the peripheries of the elastomer layers impeding lateral flow of the elastomer under axial load on the stack, and said baffle means providing escape paths for flow of the elastomer material to maintain the torsional deflection capacity of the bearing.

2. The bearing of claim 1 where the elastomer layers are thicker than the non-elastomer layers.

3. The laminated bearing of claim 1, wherein the baffle means are upstanding flanges on the peripheries of the non-elastomer layers.

4. The bearing of claim 3, wherein successive non-elastomer layers are of increasing diameter and the flanges of the successive layers cooperate with adjacent layers to provide axially opening escape paths for the elastomer layers.

5. The bearing of claim 1, wherein the baffle means includes a rigid ring surrounding the stack in spaced relation and a sleeve of elastomer between the ring and the stack bonded to the ring and the elastomer layers of the stack, and said sleeve being sufficiently thick and pliable to flow axially when the elastomer layers extrude laterally into the sleeve.

6. The bearing of claim 5, wherein the elastomer sleeve has free end faces providing escape paths for elastomer flow under axial load of the bearing.

7. The bearing of claim 1, wherein the baffle means is a ring of circumferentially spaced upstanding rods embracing the stack, and means for holding the rods in place embracing the stack.

8. A laminated bearing comprising a stack of bonded together alternate layers of metal and rubber, said rubber layers being at least twice as thick as said metal layers, said rubber layers capable of lateral flow of elastomer beyond the perimeters of the metal layers under heavy axial load, said stack accommodating torsional deflection along the height thereof and resisting axial collapse during torsional deflection, baffle means surrounding the stack effective to change the direction of flow of the rubber layers when the stack is axially loaded, and said baffle means coacting with said stack to provide escape paths for rubber flow for maintaining the torsional deflection capacity of the stack.

9. A laminated bearing which comprises a plurality of non-elastomer and elastomer layers in stacked bonded together relation, rigid baffle means contacting the periphery of the elastomer layers of the stack and coacting with the metal layers to provide restricted flow paths for the rubber layers in the event of extrusion of the layers under heavy load, said rubber layers sufficiently thick to extrude beyond their normal peripheries under axial load, and said flow paths being so dimensioned as to maintain ample capacity for the rubber to absorb torsional stress while resisting decrease in thickness of the layers.

10. The bearing of claim 9 wherein the baffle means is a ring of circumferentially spaced upstanding rods embracing the stack and including means for holding the rods in place embracing the said stack.

11. The bearing of claim 10 wherein the rods are the warp of a screen and the means are the woof.

References Cited

UNITED STATES PATENTS 2,726,080   12/1955   Withall _____ 267—1
3,228,673   1/1966    Hinks _____ 267—57.1

JAMES B. MARBERT, Primary Examiner